United States Patent
Park et al.

(10) Patent No.: US 11,951,890 B2
(45) Date of Patent: Apr. 9, 2024

(54) SEAT SIDE BOLSTER APPARATUS AND CONTROL METHOD THEREOF

(71) Applicant: HYUNDAI TRANSYS INCORPORATED, Seosan-si (KR)

(72) Inventors: Jae Keun Park, Hwaseong-si (KR); Do Hyun Kim, Yongin-si (KR); Sung Hyun Jo, Suwon-si (KR); Seung Joon Lee, Hwaseong-si (KR); Jae Sang Lim, Osan-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 31 days.

(21) Appl. No.: 17/863,908

(22) Filed: Jul. 13, 2022

(65) Prior Publication Data
US 2023/0018645 A1 Jan. 19, 2023

(30) Foreign Application Priority Data
Jul. 14, 2021 (KR) .................. 10-2021-0092428

(51) Int. Cl.
| | |
|---|---|
| *B60N 2/90* | (2018.01) |
| *B60N 2/02* | (2006.01) |
| *B60N 2/58* | (2006.01) |
| *A47C 1/023* | (2006.01) |
| *B60N 2/62* | (2006.01) |

(52) U.S. Cl.
CPC ............ *B60N 2/99* (2018.02); *B60N 2/0224* (2013.01); *B60N 2/58* (2013.01); *A47C 1/023* (2013.01); *B60N 2/02253* (2023.08); *B60N 2/62* (2013.01); *B60N 2/986* (2018.02)

(58) Field of Classification Search
CPC . A47C 1/023; B60N 2/99; B60N 2/62; B60N 2/986
See application file for complete search history.

(56) References Cited

U.S. PATENT DOCUMENTS

| | | | |
|---|---|---|---|
| 8,128,147 B1 * | 3/2012 | Kanda ................ | B60N 2/02246 296/65.05 |
| 10,759,320 B2 | 9/2020 | Mochizuki | |
| 2020/0238878 A1 * | 7/2020 | Song .................... | B60N 2/0232 |

FOREIGN PATENT DOCUMENTS

| | | | | |
|---|---|---|---|---|
| FR | 2902377 A1 | * | 12/2007 | .......... B60N 2/3002 |
| JP | 2000-157376 A | | 6/2000 | |
| JP | 2008260326 A | | 10/2008 | |
| KR | 101358956 B1 | | 2/2014 | |
| KR | 10-1395364 B1 | | 5/2014 | |
| KR | 101422820 B1 | | 8/2014 | |
| KR | 10-2020-0078990 A | | 7/2020 | |

* cited by examiner

*Primary Examiner* — Syed A Islam
(74) *Attorney, Agent, or Firm* — Bridgeway IP Law Group, PLLC; Jihun Kim

(57) ABSTRACT

Proposed are a seat side bolster apparatus and a control method thereof. The seat side bolster apparatus of the disclosure includes a driving unit, which is provided under a foam pad of a seat cushion, is moved upwards and downwards by operation of an actuator, and presses the foam pad upwards when moving upwards, and a covering bracket, which is connected to the driving unit so as to be moved upwards and downwards together with the driving unit and to which an end of a covering enveloping the foam pad of the seat cushion is fixed.

12 Claims, 11 Drawing Sheets

SEAT SIDE BOLSTER APPARATUS AND CONTROL METHOD THEREOF

CROSS-REFERENCE TO RELATED APPLICATION

This application claims the priority benefit of Korean Patent Application No. 10-2021-0092428, filed July 14 in the Korean Intellectual Property Office, the disclosure of which is incorporated herein by reference.

BACKGROUND OF THE INVENTION

1. Field of the Invention

The present invention relates to a seat side bolster apparatus and a control method thereof, and more particularly to a seat side bolster apparatus and a control method thereof capable of preventing a seat covering from being damaged by contact friction between a bolster and an occupant when the occupant gets in or out of a vehicle and preventing the bolster from making it difficult to get in or out of the vehicle.

2. Description of the Related Art

A bolster apparatus for a vehicle is an apparatus for supporting a driver or a passenger when the vehicle travels at a high speed or makes a sharp turn, thereby preventing the body of the driver or the passenger from being biased in one direction. If the driver's body is biased in one direction, the driver is likely to lose hold of the steering wheel and thus to fail to properly steer the vehicle, which may lead to an accident. Therefore, the bolster apparatus is one of essential apparatuses for vehicles.

A bolster apparatus is primarily disposed at the lower end of a seat or on the side surface of a contact portion between a seat cushion and a seatback, and is formed so as to protrude to a predetermined height.

In the case of a conventional bolster, the height to which the bolster protrudes is adjusted when a vehicle travels at a high speed or makes a sharp turn, but is not adjusted when an occupant gets in or out of the vehicle. Thus, the bolster interferes with entry or exit of the occupant into or from the vehicle, thus making it inconvenient to get in or out of the vehicle. In addition, a seat covering, which envelops the bolster and is primarily made of a leather material, is easily worn by frequent friction with the occupant's body.

It may be possible to prevent the seat covering from becoming easily worn by improving the properties of the leather material that is used for the seat covering. However, the elevated bolster is a factor that makes it inconvenient to get in or out of the vehicle. Therefore, there is need for a seat side bolster apparatus and a control method thereof capable of changing the height to which a bolster protrudes when an occupant gets in or out of a vehicle.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide a seat side bolster apparatus including a driving unit, which is provided under a foam pad of a seat cushion, is moved upwards and downwards by operation of an actuator, and presses the foam pad upwards when moving upwards, and a covering bracket, which is connected to the driving unit so as to be moved upwards and downwards together with the driving unit and to which an end of a covering enveloping the foam pad of the seat cushion is fixed, and a method of controlling the bolster apparatus.

In accordance with an aspect of the present invention, the above and other objects can be accomplished by the provision of a seat side bolster apparatus including a driving unit, which is provided under a foam pad of a seat cushion, is moved upwards and downwards by operation of an actuator, and presses the foam pad upwards when moving upwards, and a covering bracket, which is connected to the driving unit so as to be moved upwards and downwards together with the driving unit and to which an end of a covering enveloping the foam pad of the seat cushion is fixed.

The driving unit may include a support plate provided under the foam pad and a link bracket configured to enable the support plate and the covering bracket to be driven in response to operation of the actuator. When the link bracket is moved upwards by operation of the actuator, the support plate may press the foam pad upwards and may move the covering bracket upwards.

The support plate, the covering bracket, and the link bracket may have first connection holes formed therein such that the first connection holes are aligned with each other, and the seat side bolster apparatus may further include a fastening member configured to be fastened into the first connection holes to connect the support plate, the covering bracket, and the link bracket to each other.

The link bracket may have a second connection hole formed therein, and the actuator may be linked to the second connection hole to be connected to the link bracket.

The covering bracket and the support plate may form a separation space therebetween to accommodate a side bracket fixed to a seat, and may move upwards and downwards relative to the side bracket.

The support plate, the covering bracket, and the link bracket may have first connection holes formed therein such that the first connection holes are aligned with each other, and the seat side bolster apparatus may further include a fastening member configured to be fastened into the first connection holes. The side bracket may have a slit formed therein so as to be aligned with the first connection holes, and the fastening member may be fastened into the first connection holes and the slit to couple the covering bracket, the support plate, and the link bracket to the side bracket.

The slit formed in the side bracket may extend in the upward-downward direction.

The slit may have a section extending upwards from the lower end to the middle portion thereof while being inclined forwards and a section extending upwards from the middle portion to the upper end thereof while being inclined backwards.

The seat side bolster apparatus may further include a controller configured to control the driving unit to move downwards when a door adjacent to the side surface of the seat cushion is opened and to control the driving unit to move upwards when the door adjacent to the side surface of the seat cushion is closed.

The driving unit may be provided under the foam pad of the side facing the door, among both sides of the seat cushion.

The actuator may include a motor and a ball-screw mechanism connected to the motor. The ball-screw mechanism may implement forward-backward movement in response to rotation of the motor.

The covering bracket may be provided at one end thereof with a hook to fix the end of the covering.

In accordance with another aspect of the present invention, a method of controlling the seat side bolster apparatus described above includes opening the door to get in or out of a vehicle, driving the actuator to move the driving unit downwards in order to move the support plate and the covering bracket downwards, closing the door, and driving the actuator to move the driving unit upwards in order to move the support plate and the covering bracket upwards.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. In the following description of the present invention, a detailed description of known functions and configurations incorporated herein will be omitted when it may make the subject matter of the present invention rather unclear. In addition, the present invention is not limited to the embodiments set forth herein, and it should be understood that various changes and modifications can be made by those skilled in the art to which the present invention pertains within the spirit and scope of the invention.

Figure 1:
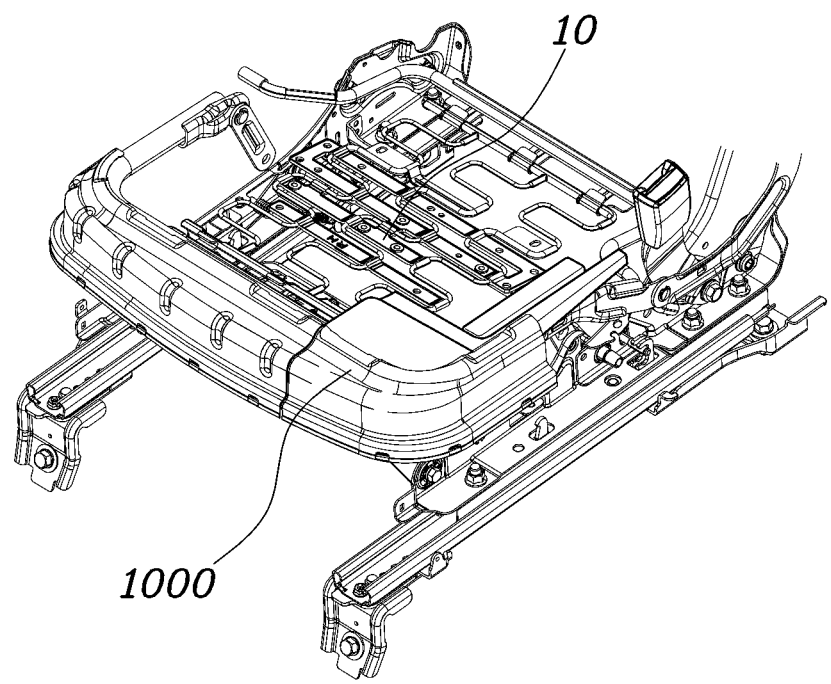
FIG. 1 is a perspective view of a seat side bolster apparatus disposed in a seat cushion, according to an embodiment of the present invention.
Figure 2:
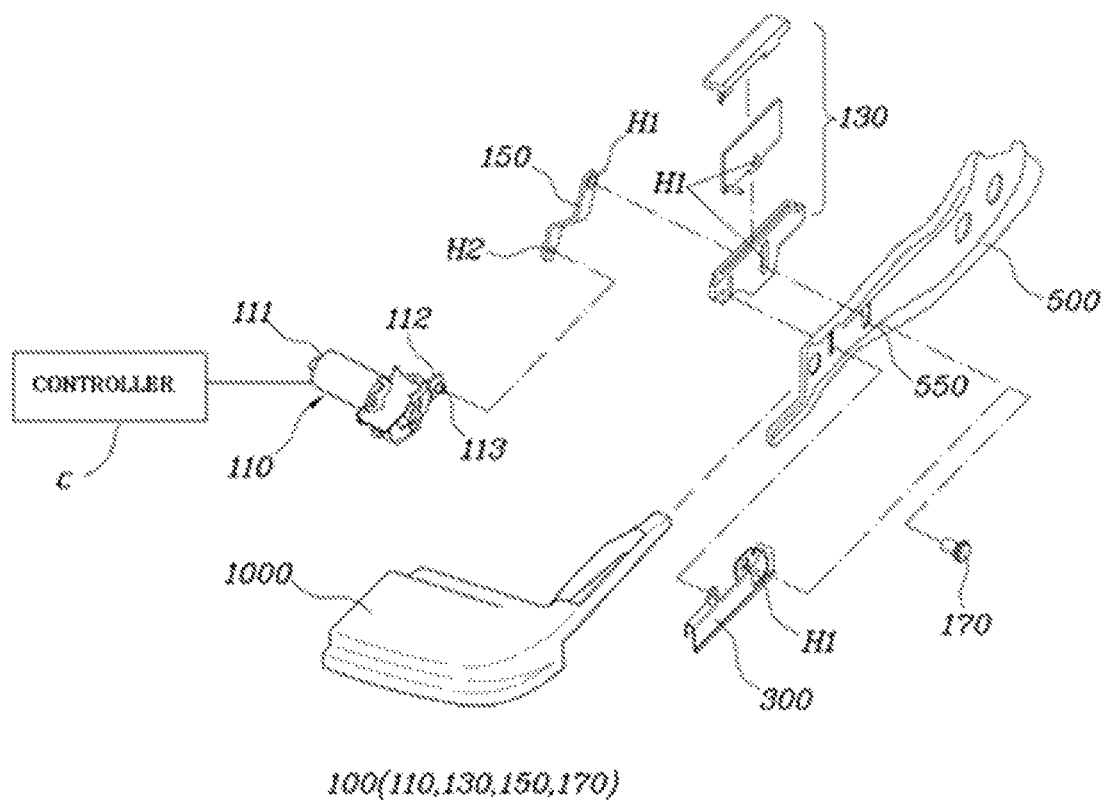
FIG. 2 is an exploded perspective view of the seat side bolster apparatus as shown in FIG. 1.
Figure 5:
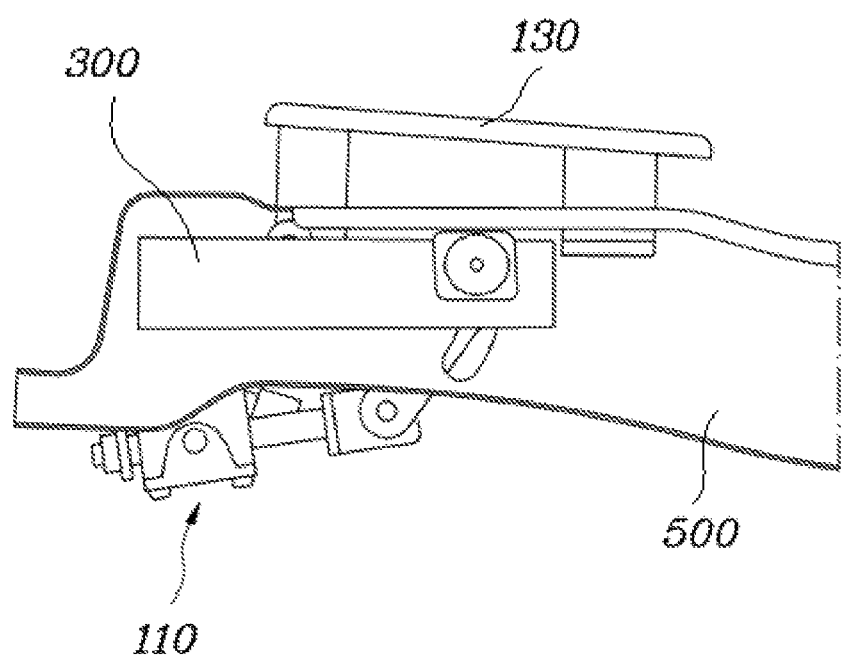
Figure 6:
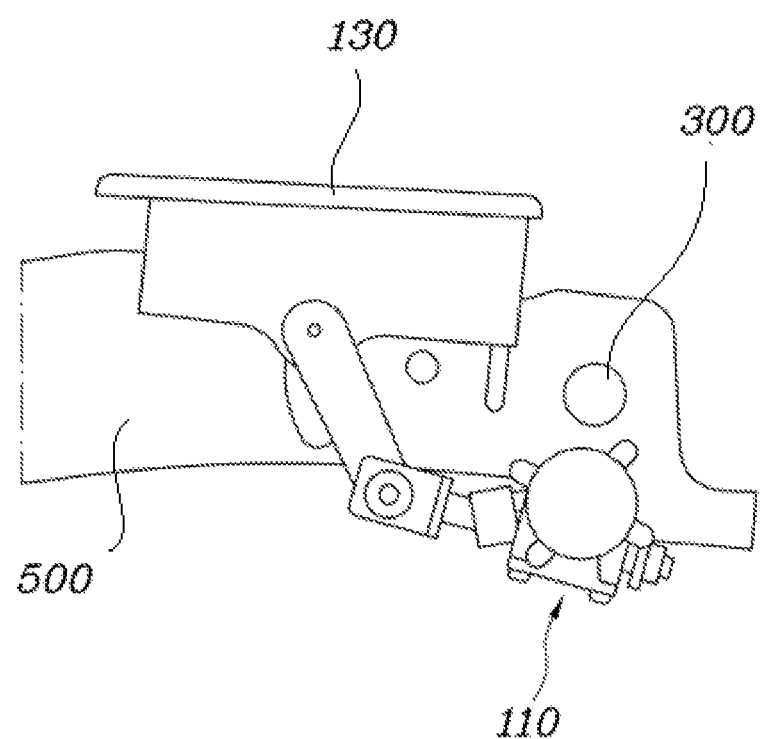
Figure 7:
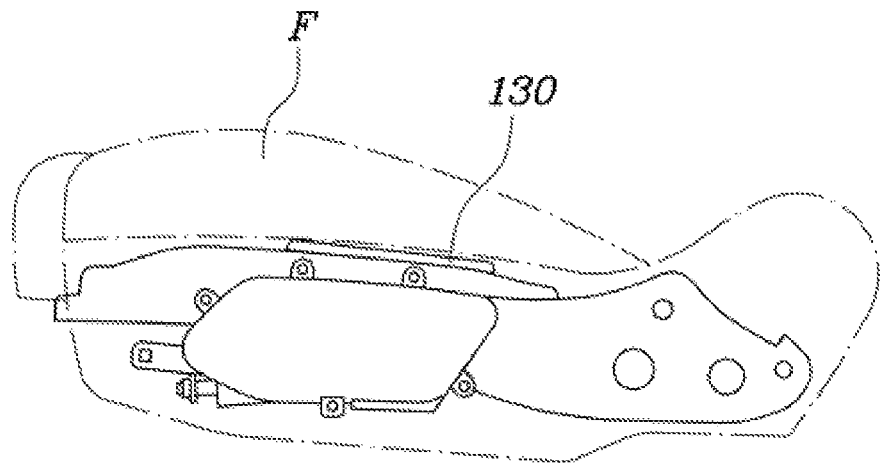
FIGS. 7 and 8 are other views showing ascent and descent of the driving unit and the covering bracket of the seat side bolster apparatus according to the embodiment of the present invention.
Figure 8:
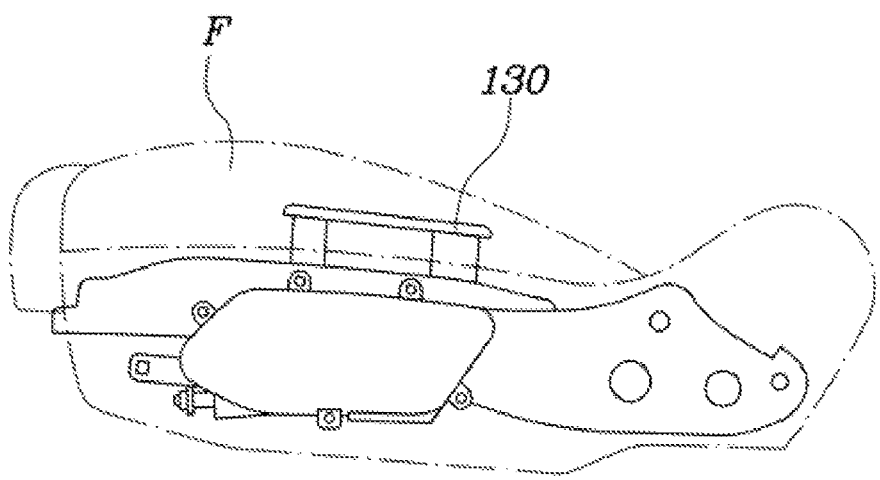
Figure 9:
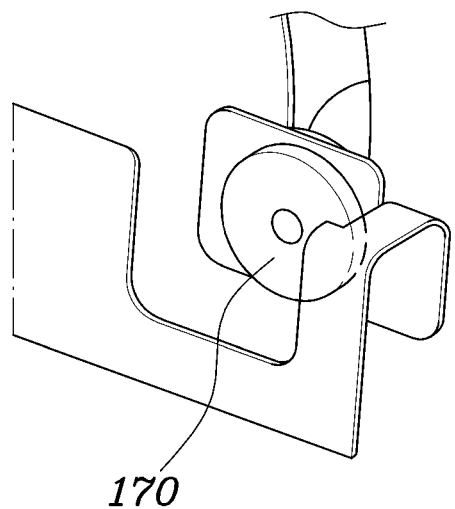
FIGS. 9 to 11 are views showing a side bracket, a covering bracket, and a link bracket of the seat side bolster apparatus according to the embodiment of the present invention.
Figure 10:
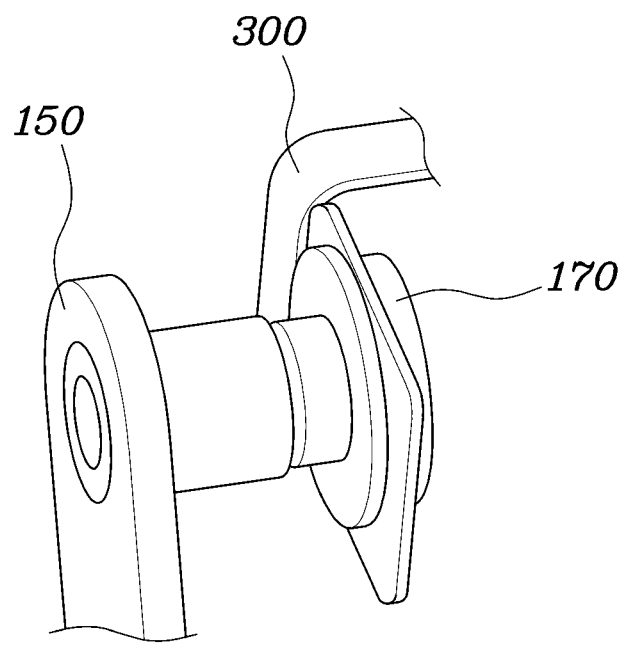
Figure 11:
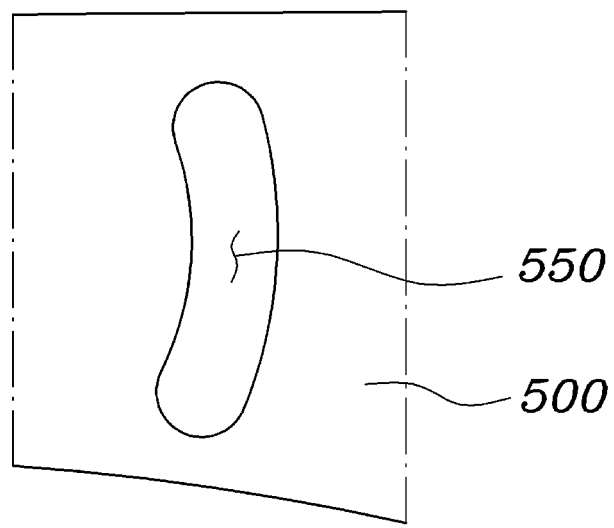
Figure 12:
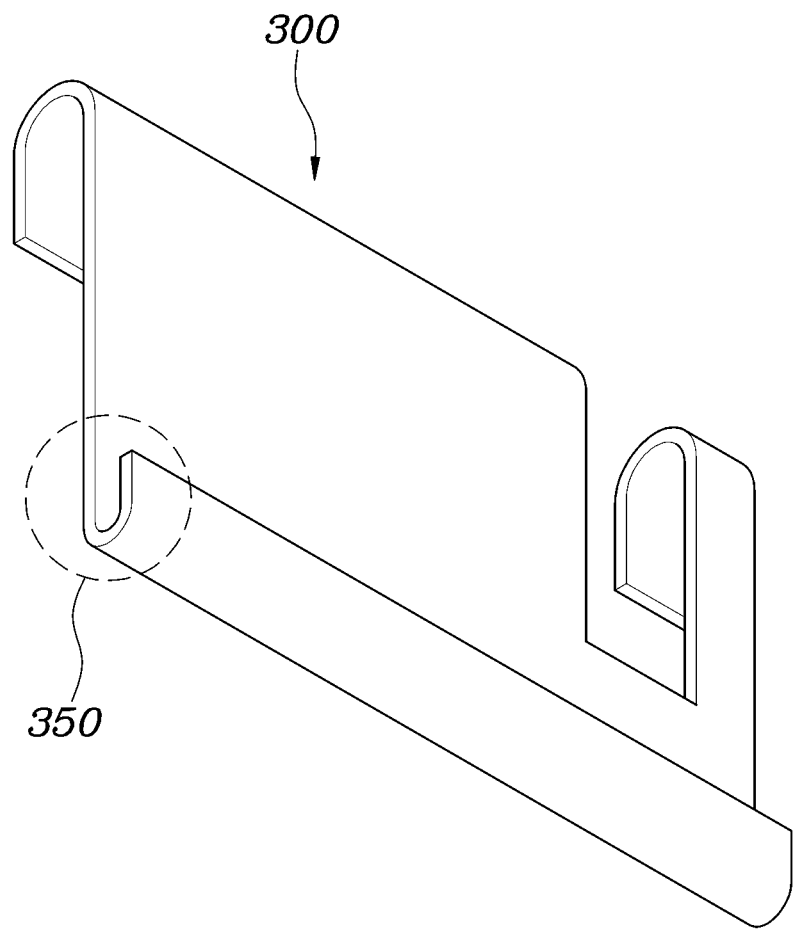
FIG. 12 is a view showing the covering bracket of the seat side bolster apparatus according to the embodiment of the present invention.
Figure 13:
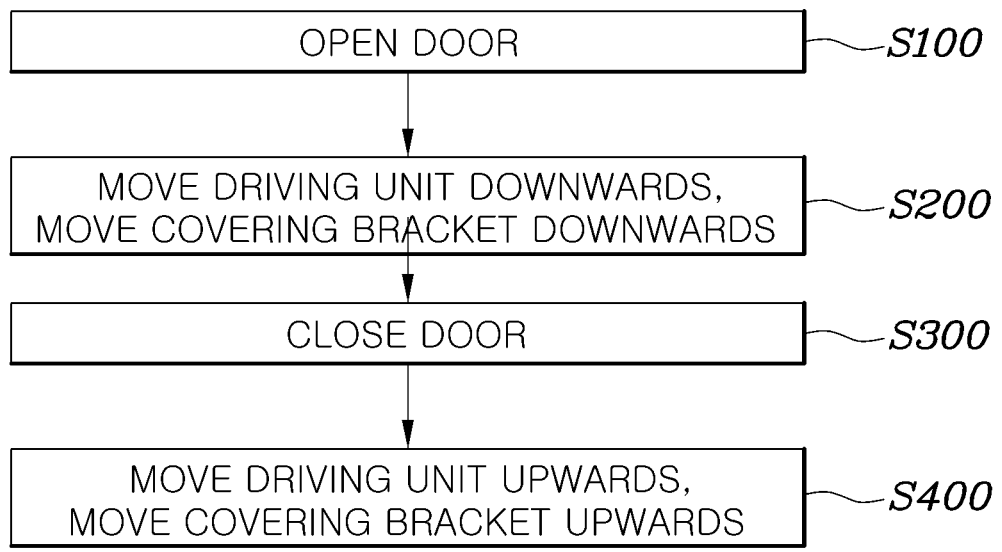
FIG. 13 is a flowchart of a method of controlling the seat side bolster apparatus according to an embodiment of the present invention.

FIG. 1 is an exploded perspective view of a seat side bolster apparatus disposed in a seat cushion, according to an embodiment of the present invention, and FIG. 2 is an exploded perspective view of the seat side bolster apparatus as shown in FIG. 1. FIGS. 3 to 6 are views showing ascent and descent of a driving unit and a covering bracket of the seat side bolster apparatus according to the embodiment of the present invention. FIGS. 7 and 8 are other views showing ascent and descent of the driving unit and the covering bracket of the seat side bolster apparatus according to the embodiment of the present invention. FIGS. 9 to 11 are views showing a side bracket, a covering bracket, and a link bracket of the seat side bolster apparatus according to the embodiment of the present invention. FIG. 12 is a view showing the covering bracket of the seat side bolster apparatus according to the embodiment of the present invention. FIG. 13 is a flowchart of a method of controlling the seat side bolster apparatus according to an embodiment of the present invention.

A seat side bolster apparatus 1000 according to the present invention includes a driving unit 100, which is provided under a foam pad of a seat cushion 10, is moved upwards and downwards by operation of an actuator 110, and presses the foam pad upwards when moving upwards, and a covering bracket 300, which is connected to the driving unit 100 so as to be moved upwards and downwards together with the driving unit 100 and to which an end of a covering enveloping the foam pad of the seat cushion is fixed.

An advantage of the present invention is to adjust the height to which the seat side bolster protrudes. Another advantage of the present invention is to prevent the covering of the seat from stretching due to repetitive adjustment of the protruding height of the seat side bolter. To this end, an end of the covering is connected to the covering bracket 300 so as to be fixed thereto, and the covering bracket 300 is connected to the driving unit 100 so as to be moved upwards and downwards together with the driving unit 100. Accordingly, when the covering bracket 300 is moved upwards and downwards, the end of the covering is moved together therewith.

Figure 3:
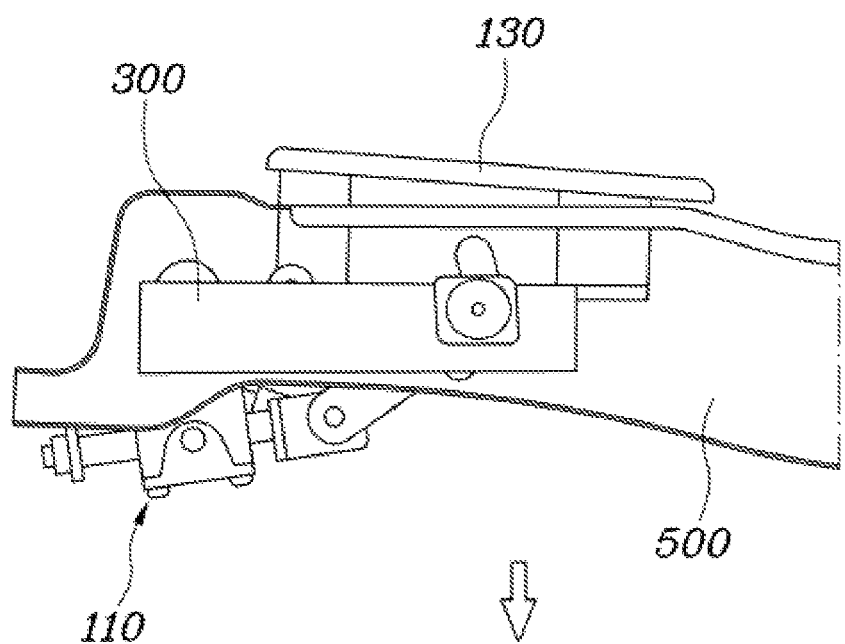
FIGS. 3 to 6 are views showing ascent and descent of a driving unit and a covering bracket of the seat side bolster apparatus according to the embodiment of the present invention.
Figure 4:
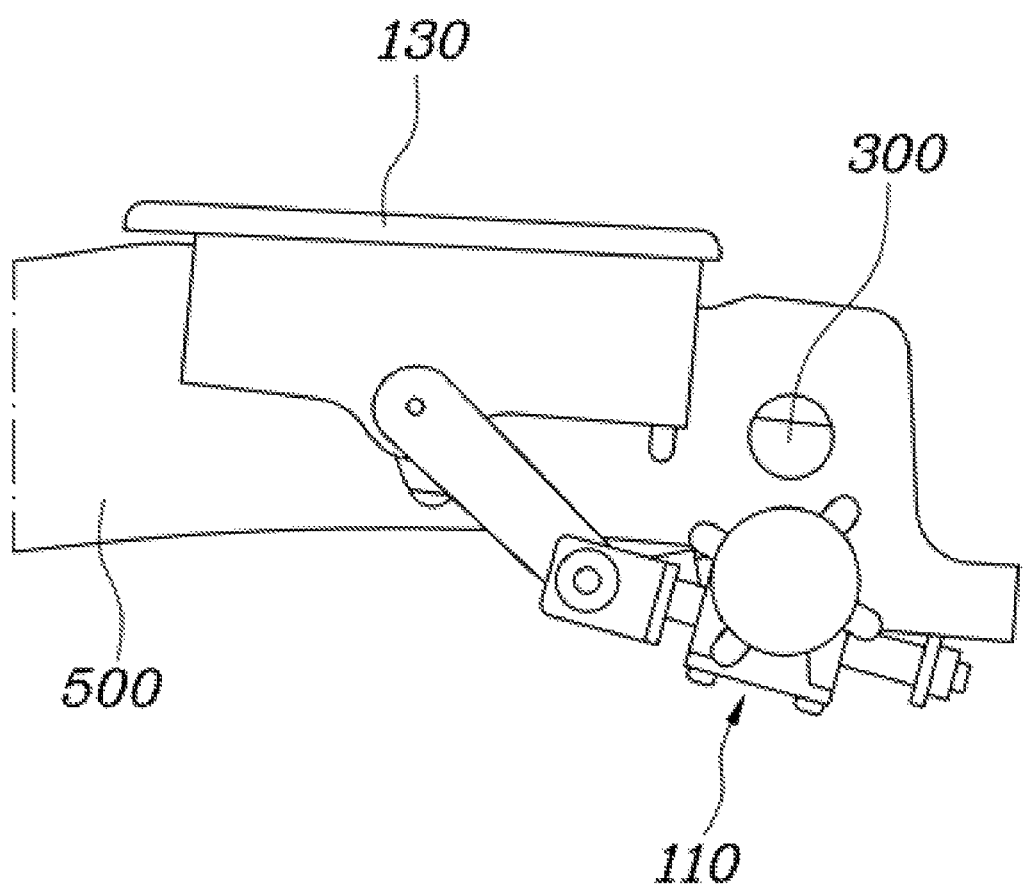

FIG. 1 is an exploded perspective view of the seat side bolster apparatus disposed in a seat cushion, according to an embodiment of the present invention. FIGS. 3 and 4 are views showing descent of the driving unit and the covering bracket of the seat side bolster apparatus when viewed from both sides, and FIGS. 5 and 6 are views showing ascent of the driving unit and the covering bracket of the seat side bolster apparatus when viewed from both sides.

FIGS. 7 and 8 are other views showing ascent and descent of the driving unit and the covering bracket of the seat side bolster apparatus according to the embodiment of the present invention.

The actuator 110 of the present invention includes a motor 111 and a ball-screw mechanism 112 connected to the motor 111. The ball-screw mechanism 112 implements forward-backward movement in response to rotation of the motor 111. That is, it is preferable for the actuator to be a ball-screw motor.

The driving unit 100 is moved upwards and downwards in response to operation of the actuator 110. The driving unit 100 is provided with a support plate 130, which is configured to press a foam pad F. The foam pad F refers to a foamed resin charged in a seat frame. The support plate 130 is provided under the foam pad F. When the support plate 130 is moved upwards by the driving unit, the support plate 130 presses the foam pad F upwards. Accordingly, the foam pad F protrudes upwards, and the seat side bolster also protrudes upwards.

The covering bracket 300 is a component to which the covering, which envelops the foam pad and forms the outer surface of the seat, is connected and fixed. When the driving unit 100 moves upwards and downwards, the covering bracket 300 also moves upwards and downwards in response thereto. The covering is primarily made of a leather material for improved seating comfort and aesthetic appearance. However, a covering made of a leather material may stretch due to repeated ascent and descent of the seat side bolster. According to the present invention, in order to minimize deformation of the covering, the covering is connected to the covering bracket 300 so that the covering is capable of repeatedly moving upwards and descends in response to ascent and descent of the driving unit 100. Referring to FIG. 12, in order to connect the covering to the covering bracket 300, the covering bracket 300 may be provided at one end thereof with a hook 350 for fixing an end of the covering.

The driving unit 100 includes a link bracket 150, by which the support plate 130 and the covering bracket 300 are driven in response to operation of the actuator 110. One end of the link bracket 150 is connected to the actuator 110 to transmit the power from the actuator 110 to the support plate 130 and the covering bracket 300, and the other end of the link bracket 150 is connected to the support plate 130 and the covering bracket 300 to enable the support plate 130 and the covering bracket 300 to receive the power from the actuator 110.

This will be described in detail with reference to FIGS. 9 to 11. The support plate 130, the covering bracket 300, and the link bracket 150 have the following connection relationships therebetween. Each of the support plate 130, the covering bracket 300, and the link bracket 150 has a first connection hole H1 formed in one side thereof such that the first connection holes H1 are aligned with each other. A fastener 170 is fastened into the first connection holes H1 in order to connect the support plate 130, the covering bracket 300, and the link bracket 150 to each other. The link bracket 150 has a second connection hole H2 formed in the opposite side thereof in order to be connected to the actuator 110. In detail, the actuator 110 is provided with a connection protrusion 113, and the connection protrusion 113 is inserted into the second connection hole H2 in the link bracket 150, whereby the link bracket 150 is connected to the actuator 110. Accordingly, the support plate 130 and the covering bracket 300 are capable of being moved upwards and downwards by the power received from the actuator 110 via the link bracket 150.

Referring to FIGS. 1 to 6, a separation space is formed between the covering bracket 300 and the support plate 130, and a side bracket 500, which is fixed to the seat, is provided in the separation space. The covering bracket 300 and the support plate 130 move upwards and downwards relative to the side bracket 500. The covering bracket 300 is located on one surface of the side bracket 500, and the support plate 130 is located on the opposite surface of the side bracket 500. Preferably, the covering bracket 300 is located on the outer surface of the side bracket 500 so as to face a vehicle door adjacent thereto.

The covering is fixed to the covering bracket 300 by being pulled so as to be in close contact with the foam pad of the seat. Therefore, if the covering bracket 300 is located on the inner surface of the side bracket 500, it is structurally difficult to fix the covering to the covering bracket 300. The side bracket 500 is fixed to the seat. Specifically, the side bracket 500 is fixed to the side surface of a seat frame. The side bracket 500 has a slit 550 formed in one side thereof so as to be aligned with the first connection holes H1. The fastener 170 is fastened into the first connection holes H1 and the slit 550, whereby the covering bracket 300, the support plate 130, and the link bracket 150 are coupled to the side bracket 500.

Accordingly, the side bracket 500 is a fixed part for guiding upward and downward movement of the support plate 130 and the link bracket 150. Particularly, the support plate 130 and the link bracket 150 are connected to the slit 550 formed in the side bracket 500, and thus upward and downward movement thereof is enabled. The slit 550 is formed to extend in the upward-downward direction so that the support plate 130 and the link bracket 150 are capable of moving upwards and downwards. The height to which the seat side bolster is capable of protruding may be adjusted depending on the length of the slit 550. The position to which the seat side bolster protrudes may be adjusted in a manner limited by the shape of the slit 550.

Referring to FIGS. 9 to 11, the slit 550 may be formed such that a section extending upwards from the lower end to the middle portion thereof is inclined forwards and a section extending upwards from the middle portion to the upper end thereof is inclined backwards. Because the slit 550 is formed in the side bracket 500, if the slit 550 has a vertically linear shape, the length of the slit 550 needs to be formed to be shorter than the vertical length of the side bracket 500. Therefore, in order to enable the slit 550 to have a length suitable for the maximum extent to which the actuator 110 is capable of being driven, the slit 550 may be formed in a curved shape, as described above, or may be formed in a linearly inclined shape.

The seat side bolster apparatus 1000 may further include a module cover 700, which is disposed on the upper surface of the side bracket 500, at which the support plate 130 and the covering bracket 300 are located, in order to cover the upper surface of the side bracket 500.

In addition, the seat side bolster apparatus 1000 may further include a controller C, which performs control such that the driving unit 100 is moved downwards when the door adjacent to the side surface of the seat cushion is opened and such that the driving unit 100 is moved upwards when the door adjacent to the side surface of the seat cushion is closed. That is, when a driver gets in or out of the vehicle, the elevated seat side bolster makes it difficult to get in or out of the vehicle. Therefore, when the driver opens the door of the vehicle, the controller controls the actuator 110 to move the driving unit 100 downwards, whereby the support plate 130 is moved downwards, and consequently, the seat side bolster is moved downwards. When the driver closes the door of the vehicle after getting out of the vehicle, the controller performs control such that the seat side bolster is moved upwards. In another embodiment, a sensor for sensing the body pressure of the driver may be mounted in the seat. In the case in which the body pressure of the driver is not sensed, even when the door is closed, the controller may perform control such that the seat side bolster is not moved upwards.

The seat side bolster that makes it difficult to get in or out of the vehicle is a bolster disposed adjacent to the door. Therefore, the driving unit 100 may be provided only under the foam pad of a side facing the door, among both sides of the seat cushion. In other words, not all of the seat side bolsters need to be movable upwards and downwards. Only the seat side bolster adjacent to the door, which makes it difficult to get in or out of the vehicle, may be configured to be movable upwards and downwards.

Referring to FIG. 13, a method of controlling the seat side bolster apparatus includes steps of opening the door to get in or out of the vehicle (S100), driving the actuator to move the driving unit downwards in order to move the support plate and the covering bracket downwards (S200), closing the door (S300), and driving the actuator to move the driving unit upwards in order to move the support plate and the covering bracket upwards (S400). That is, when the driver gets in or out of the vehicle, the elevated seat side bolster makes it difficult to get in or out of the vehicle. Therefore, when the driver opens the door of the vehicle, the actuator is controlled to move the driving unit downwards, whereby the support plate is moved downwards, and consequently, the seat side bolster is moved downwards. When the driver closes the door of the vehicle after getting out of the vehicle, the seat side bolster is controlled to be moved upwards.

As is apparent from the above description, according to the seat side bolster apparatus and the control method thereof of the present invention, the height to which the seat side bolster protrudes is adjusted when an occupant gets in or out of the vehicle, thereby eliminating inconvenience when getting in or out of the vehicle due to the elevated position of the bolster and preventing the seat covering from becoming worn or damaged.

Although specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A seat side bolster apparatus comprising:
   a driving unit provided under a foam pad of a seat cushion, the driving unit being configured to be moved upwards and downwards by operation of an actuator and to press the foam pad upwards when moving upwards; and
   a covering bracket connected to the driving unit so as to be moved upwards and downwards together with the driving unit, the covering bracket being configured to allow an end of a covering enveloping the foam pad of the seat cushion to be fixed thereto,
   wherein the driving unit comprises:
   a support plate provided under the foam pad; and
   a link bracket configured to enable the support plate and the covering bracket to be driven in response to operation of the actuator, and
   wherein, when the link bracket is moved upwards by operation of the actuator, the support plate presses the foam pad upwards and moves the covering bracket upwards.

2. The seat side bolster apparatus according to claim 1, wherein the support plate, the covering bracket, and the link bracket have first connection holes formed therein such that the first connection holes are aligned with each other, and
   wherein the seat side bolster apparatus further comprises a fastener configured to be fastened into the first connection holes to connect the support plate, the covering bracket, and the link bracket to each other.

3. The seat side bolster apparatus according to claim 1, wherein the link bracket has a second connection hole formed therein, and
   wherein the actuator is linked to the second connection hole to be connected to the link bracket.

4. The seat side bolster apparatus according to claim 1, wherein the covering bracket and the support plate form a separation space therebetween to accommodate a side bracket fixed to a seat, and move upwards and downwards relative to the side bracket.

5. The seat side bolster apparatus according to claim 4, wherein the support plate, the covering bracket, and the link bracket have first connection holes formed therein such that the first connection holes are aligned with each other,
   wherein the seat side bolster apparatus further comprises a fastening member configured to be fastened into the first connection holes,
   wherein the side bracket has a slit formed therein so as to be aligned with the first connection holes, and
   wherein the fastening member is fastened into the first connection holes and the slit to couple the covering bracket, the support plate, and the link bracket to the side bracket.

6. The seat side bolster apparatus according to claim 5, wherein the slit formed in the side bracket extends in an upward-downward direction.

7. The seat side bolster apparatus according to claim 6, wherein the slit has a section extending upwards from a lower end to a middle portion thereof while being inclined forwards and a section extending upwards from the middle portion to an upper end thereof while being inclined backwards.

8. The seat side bolster apparatus according to claim 1, further comprising:
   a controller configured to control the driving unit to move downwards when a door adjacent to a side surface of the seat cushion is opened and to control the driving unit to move upwards when the door adjacent to the side surface of the seat cushion is closed.

9. The seat side bolster apparatus according to claim 1, wherein the seat cushion has a side facing a door, and the driving unit is disposed under the foam pad of the side of the seat cushion facing the door.

10. The seat side bolster apparatus according to claim 1, wherein the actuator comprises:
    a motor; and
    a ball-screw mechanism connected to the motor, and
    wherein the ball-screw mechanism implements forward-backward movement in response to rotation of the motor.

11. The seat side bolster apparatus according to claim 1, wherein the covering bracket is provided at one end thereof with a hook to fix the end of the covering.

12. A method of controlling the seat side bolster apparatus according to claim 8, the method comprising:
    opening the door to get in or out of a vehicle;
    driving the actuator to move the driving unit downwards in order to move a support plate and the covering bracket downwards;
    closing the door; and
    driving the actuator to move the driving unit upwards in order to move the support plate and the covering bracket upwards.

* * * * *